United States Patent
Li et al.

(10) Patent No.: US 7,625,151 B2
(45) Date of Patent: Dec. 1, 2009

(54) SYSTEM AND METHOD FOR AN ADJUSTABLE CONNECTOR

(75) Inventors: Xi Ming Li, Brooklyn, NY (US); Steve Hebeisen, Somers, NY (US); Salvatore Vasapolli, Smithtown, NY (US)

(73) Assignee: Mechoshade Systems, Inc., Long Island City, NY (US)

( * ) Notice: Subject to any disclaimer, the term of this patent is extended or adjusted under 35 U.S.C. 154(b) by 142 days.

(21) Appl. No.: 11/740,757

(22) Filed: Apr. 26, 2007

(65) Prior Publication Data

US 2007/0253768 A1 Nov. 1, 2007

Related U.S. Application Data

(60) Provisional application No. 60/745,699, filed on Apr. 26, 2006.

(51) Int. Cl.
*F16D 1/12* (2006.01)
(52) U.S. Cl. .................. 403/102; 403/14; 403/362; 403/409.1; 160/324; 160/325
(58) Field of Classification Search ........... 403/13, 403/14, 84, 91, 102, 292, 362, 409.1; 160/323.1, 160/324, 325
See application file for complete search history.

(56) References Cited

U.S. PATENT DOCUMENTS

| | | | |
|---|---|---|---|
| 1,345,735 A | 7/1920 | Bailey | |
| 2,348,071 A | 6/1942 | Johnstone | |
| 3,298,197 A | 9/1964 | Roth | |
| 3,387,465 A | 8/1966 | Walker | |
| 3,389,738 A | 2/1967 | Roth | |
| 3,521,694 A * | 7/1970 | Anderson | 160/323.1 |
| 3,724,239 A | 4/1973 | Calistrat | |
| 4,657,059 A | 4/1987 | Clauss | |
| 4,836,264 A | 6/1989 | Machin | |
| 4,891,034 A | 1/1990 | Wilhelmsen | |
| 5,105,871 A * | 4/1992 | Baud et al. | 160/323.1 |
| 5,139,072 A | 8/1992 | Marocco | |
| 5,580,184 A * | 12/1996 | Riccitelli | 403/362 |
| 5,762,556 A | 6/1998 | Kurian | |
| 5,848,947 A * | 12/1998 | Fornasiere et al. | 474/96 |
| 5,984,564 A | 11/1999 | Mitterreiter | |
| 2005/0087313 A1 | 4/2005 | Nichols | |

FOREIGN PATENT DOCUMENTS

| | | |
|---|---|---|
| DE | 19546203 C1 | 3/1997 |
| DE | 19933860 A1 | 2/2001 |
| EP | 0301666 A1 | 1/1989 |

* cited by examiner

*Primary Examiner*—Michael P Ferguson
(74) *Attorney, Agent, or Firm*—Snell & Wilmer L.L.P.

(57) ABSTRACT

A coupler system which changes the relationship of two or more rotating shade tubes is disclosed. The invention enables the installer to compensate for the height of the hembar by rotating the tube forward or backward any desired number of degrees. The coupler includes a cam which is adjusted by opposing set screws. The cam may be rotated by about 15 degrees in each direction. Adjusting the cam adjusts the second tube without adjusting the first tube (e.g., the drive or motor end tube). The adjustment device is configured to rotate the cam which, in turn, rotates the second tube to align a second hem bar hanging from the second tube with a first hem bar hanging from the first tube. The adjustments may be accomplished with minimal or no removal or adjustment of the other shades, and with minimal friction on the aligned shade.

12 Claims, 2 Drawing Sheets

SYSTEM AND METHOD FOR AN ADJUSTABLE CONNECTOR

CROSS-REFERENCE TO RELATED APPLICATIONS

This application claims priority to, and the benefit of, U.S. Provisional Application Ser. No. 60/745,699, filed Apr. 26, 2006, which is hereby incorporated by reference in its entirety.

FIELD OF INVENTION

The present invention generally includes a coupling device, and more particularly, a coupling device utilized in "multi-banded" shade assemblies.

BACKGROUND OF THE INVENTION

A multi-banded shade assembly includes a shade assembly comprising multiple smaller width shadebands. Multi-banded shade assemblies may occur in manual (e.g., chain/rope clutch assembly) and/or motorized shading systems. Multi-banded shade assemblies are advantageous because they can employ a single (or reduced) drive mechanism to operate multiple bands, thereby reducing cost and increasing maintenance efficiency. Multi-banded shade assemblies are also advantageous because they can drive a larger shade width (often times better as an assembly than as a single shade) due to limitations in the deflection of the roller tube. Multi-banded shade assemblies are further advantageous because they enable the fitting of a wide shade assembly into a smaller pocket condition. For example, by breaking a single shade down into several smaller width bands, the multi-banded assembly employs a smaller diameter tube for these bands to meet the same or better deflection characteristics across the span of the shade assembly. The deflection of the roller tube can negatively affect the flatness of the fabric falling on a shade which causes, under negative circumstances, a partial or full "smile" ripple across the fabric.

Furthermore, multi-banded shade assemblies are often very difficult to install. For example, linking up the various bands in a multi-banded group usually involves accurately aligning the bottom hembars for all of the adjacent shadebands. However, without an adjustment facility in the coupling mechanism, various factors may cause the shadebands to misalign. The factors causing misalignment include, for example, the manufacturing tolerances which accommodate the design of the coupling mechanism to the tube, the extruded diameter of the tube, the varying thickness of the fabric, the tightness with which the fabric falls onto the tube and the length of the shade. Importantly, the uniformity of the shade bands can easily vary by as much as, for example, +/−¼ inch on a 96 inch long shadeband which results in a variance of 0.0026.

Common industry practices such as, for example, "shimming" of the shadeband are usually very time consuming and only align the shade at one point in the shade's positioning. Thus, if a user tries to stop the shade assembly somewhere in the middle of the window after shimming it at the bottom, the bands are typically no longer aligned. The practice of shimming attempts to change the height of the hembar by building up the roller tube diameter in one spot using a piece of tape or paper tucked up under the shadeband near its attachment to the roller tube. This practice effectively changes the shape of the roller tube. As such, when the roller tube rotates next to a shade that did not require shimming, the two shades will often take-up fabric at different rates throughout the tubes rotation. Over multiple rotations, the effect of any differences in tube shape, and ultimately the correlation of rotational angle with circumference, affect fabric take-up on the roller tube, thereby magnifying the misalignment and causing larger and larger misalignment between the adjacent bands. A long felt need exists for an improved system and method for mounting and aligning multi-banded shade assemblies, and adjusting the height of one shade band without effecting the adjacent shade band, thereby achieving level and alignment at the hem, or at the sill, mid-point or head of a window or wall.

SUMMARY OF THE INVENTION

The coupler system is configured to change the relationship or aspect ratio of two or more rotating adjacent shade tubes. The coupler system includes an adjustable shade tube connector which couples two adjacent shade tubes together. The system and method enables the installer to compensate for the height of the bottom of the shade by rotating the tube forward or backward any desired number of degrees. This adjustment is applied substantially evenly across the entire width of the shadeband, and compensates for the height of the shadeband at the adjustment edge without effecting the opposite edge of the shadeband. The adjustment is completed with minimal or no effective changes to the shape of the rollertube, thereby minimizing the differences between adjacent shadebands. The adjustments may be accomplished with minimal or no removal or adjustment of the other shades, and with minimal friction on the aligned shade.

The coupler system includes a head component having a first side, a second side and a cam; a first drive shaft emanating from a first side of the head component, the first drive shaft mating with the first tube and with the cam; a second drive shaft emanating from a second side of the head component, the second drive shaft mating with the second tube; and, an adjustment device configured to adjust the cam. The adjustment device rotates the cam and comprises a first set screw which exerts a force on a first side of the cam, and a second set screw which exerts a force on a second side of the cam. The cam may be rotated by about 15 degrees in each direction.

In one embodiment, the coupler is located between a first tube (e.g., the drive tube or tube that directly interfaces with the motor) and a second tube such that adjusting the cam adjusts the second tube without adjusting the first tube. The adjustment device is configured to rotate the cam which, in turn, rotates the second tube to align a second hem bar hanging from the second tube with a first hem bar hanging from the first tube. After the second tube is adjusted, the installer may adjust the coupler between the second tube and third tube, which will align the third hembar with the already aligned second hembar.

In one embodiment, the head component is recessed into the first tube and/or the second tube. The first drive shaft is recessed further into the first tube than the second drive shaft is recessed into the second tube to maintain uniformity of edge clearance between the centerline of the center support bracket, the adjustable coupler, and the edges of the adjacent shadebands.

BRIEF DESCRIPTION OF THE DRAWINGS

A more complete understanding of the invention may be derived by referring to the detailed description and claims when considered in connection with the Figures, wherein like reference numbers refer to similar elements throughout the Figures, and:

DETAILED DESCRIPTION

The detailed description of exemplary embodiments describes the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1:
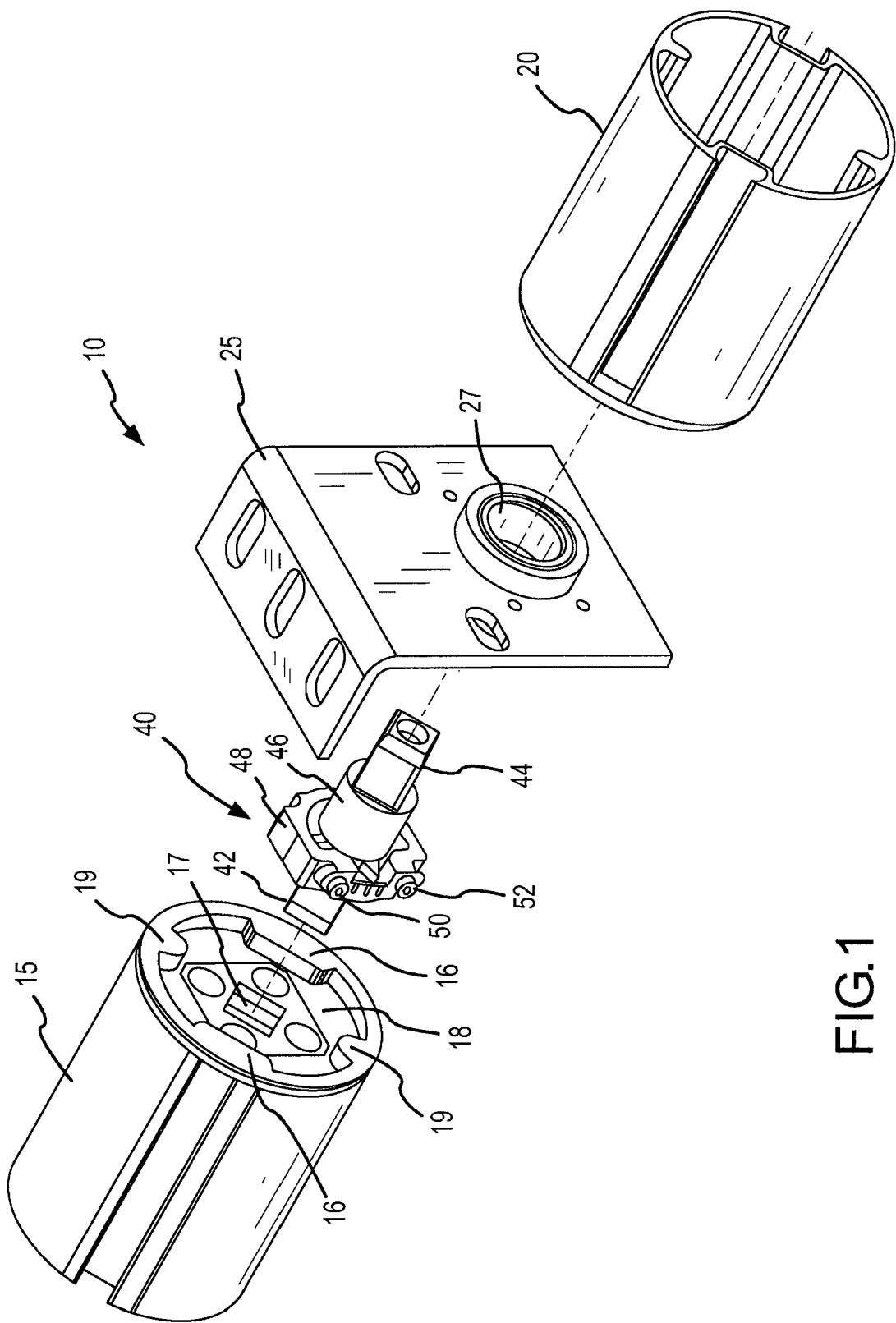
FIG. 1 is an exploded view of a multi-banded shade assembly including a coupler in accordance with an exemplary embodiment of the present invention.

In general, the present invention includes, with respect to FIG. 1, a novel coupler system 40 which enables the efficient adjustment of tubes (e.g., shade tubes 15, 20). Shade tube system 10 may include, for example, a first shade tube 15, a second shade tube 20, a bracket 25, and coupler 40. Coupler 40 may include, for example, an adjustable head component 48, a cylindrical shaft 46 which is received into opening 27 of bracket 25 and two drive shafts 42, 44 (e.g., square drive shafts) which are respectively received into shade tubes 15 and 20. While a shade tube system 10 is discussed herein, one skilled in the art will appreciate that coupler system 40 may be incorporated into any other system in which alignment of two or more parts is desired. Moreover, one skilled in the art will appreciate that shade tubes and coupler 40 may include other configurations, integrated components, non-integrated components, or other means for attachment. For example, shade tubes may include the shafts which are received into head component 48 and/or cylinder 46.

Figure 2:
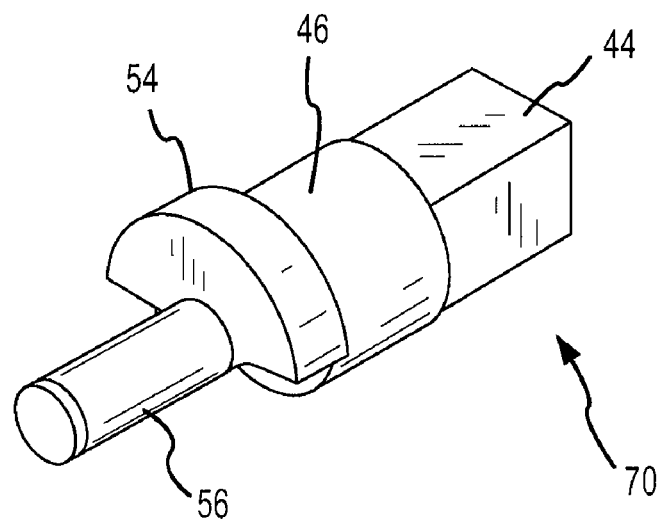
FIG. 2 is a male portion of a coupler in accordance with an exemplary embodiment of the present invention.

Coupler system 40, in one embodiment, includes two main components, namely a male portion 70 and female portion 80. One embodiment of male portion 70, with respect to FIG. 2, includes a shaft 56 and a cam 54. One embodiment of female portion 80 includes an inlet 62 configured to receive shaft 56, a recessed area 63 configured to receive cam 54, and inlets 58, 60 configured to receive screws 50, 52.

The coupler adjustment changes the relationship or aspect ratio of two or more rotating shade tubes 15, 20. Coupler 40 includes an adjustable shade tube connector which couples two adjacent shade tubes together. The invention includes one or more couplers 40 associated with each tube, and the couplers may be temporarily or permanently affixed to one or more ends of each tube, or anywhere along the tube. The coupler may be located on either end of the shade band tube 15, 20, thereby allowing the installer to simply move the coupler or flip the tube in order to adjust the appropriate shade. The coupler is scalable to facilitate the adjustment of multiple sizes of shade tubes. Coupler 40 and/or any of its components may be comprised of any material or composite. In an exemplary embodiment, the components are comprised of machined brass and bronze (or any material of similar strength) and the components may be cast from mold.

A standard coupler includes a cylindrical shaft 46 with two square drive shafts 42, 44 emanating from both sides of the cylindrical shaft. However, when incorporating the head portion 48 of coupler 40, as set forth in the present invention, head portion 48 causes the coupler 40 to become asymmetrical. To compensate for the asymmetrical design and to avoid any gaps between the shades, the invention also includes a shade tube 15 having a recessed portion within its end face 18, such that shade tube 15 reciprocally receives head portion 48. More specifically, and in an exemplary embodiment, end face 18 of shade tube 15 includes an opening 17 for receiving square drive 42, and various projections 16, 19 which are configured to allow head 48 to lay partially or fully within end face 18. In one embodiment, coupler system 40 includes a standard tube square drive 44 on one side and square drive 42 on the adjustable side that is recessed into end face 18 of shade tube 15. In this configuration, square drive 42 is configured such that the gap between the shades is substantially uniform. Because one side of the coupler (having a square drive and head component) may be larger than the other side (having only a square drive), in one embodiment, a further recessed square drive on one or both sides of the coupler 40 allows for uniformity of the space from the center line of the center support bracket 25. In an exemplary embodiment, the non-adjustable square drive 44 may be lengthened or further recessed to enable coupler 40 to be more symmetrical. Both square drive shafts which are configured to be further recessed into shade tube may be incorporated into the adjustable and non-adjustable sides of coupler 40.

In one embodiment, the coupler includes a opposing notches (e.g., on each half), electronic device or other indicator for setting the coupler in a "normal" setting. Coupler 40 may not need to be adjusted away from the normal setting, unless another level of precision is needed, then the set screws 50, 52 can be rotated, thereby adjusting the coupler away from the normal setting. In one embodiment, such indicator shows misaligned notches, analyzes set screws 50, 52 and/or cam 54 to determine when coupler has been adjusted away from a normal setting.

Coupling of the shade bands enables multiple shade bands to be driven rotationally by the same source (e.g., manual chain, cord, or motor). In one embodiment, two to six (or more) shade bands may be coupled to one motor. When adjusting a multi-banded group, the installer may start at the idle end and work across to the drive band. The side of the coupler closest to the motor may be held stationary by the motor brake/manual shade clutch. With each band, the amount of force needed to rotate the band to alignment will grow, but the force should not be excessive.

The system and method enables the installer to compensate for the height of the hembar by rotating the tube forward or backward any desired number of degrees. This adjustment is applied substantially evenly across the entire width of the shadeband, and compensates for the height of the shadeband. The adjustment is completed with minimal or no effective changes to the shape of the rollertube, thereby minimizing the differences between adjacent shadebands. The adjustments may be accomplished with minimal or no removal or adjustment of the other shades, and with minimal friction on the aligned shade.

Figure 3:
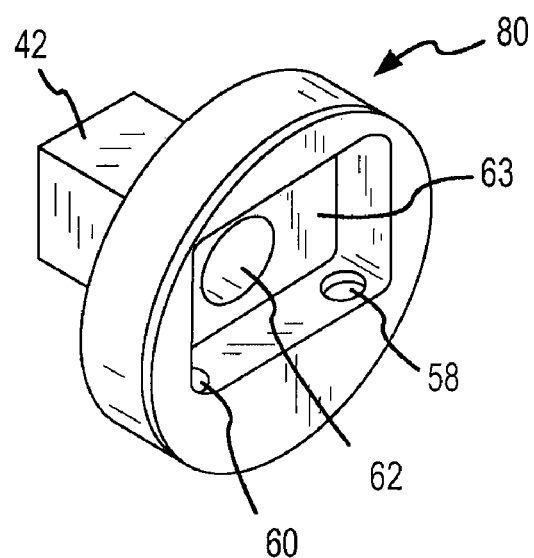
FIG. 3 is a female portion of a coupler in accordance with an exemplary embodiment of the present invention.

In one embodiment, two set screws 50, 52 (as shown in FIG. 1) support cam 54 of male portion 70 (FIG. 2) by pushing on cam 54 (e.g., half disc) inside recessed area 63 of female housing portion 80 (FIG. 3). One skilled in the art will appreciate that screws may be replaced or supplemented by any device which is configured to exert a force and/or rotate on male portion 70 or cam 54. Set screws 50, 52 support the weight and force of the shade and motor, while allowing for adjustment of the rotational alignment using the same set screws 50, 52. One of the two set screws supports the rotational force of the shade tube system on the cam, while the other set screw creates an opposing force that tensions to lock the two set screws and prevents backlash.

The present invention allows for a tighter coherence between the positioning of shadebands between two adjacent roller tubes using the same tube design. In one embodiment, the coupler transfers partial or full torque to the next shadeband assembly and does not provide any additional gearing. The range of adjustment is established by the angle between the ends of cam 54 (or the surfaces above inlets 58 and 60 in FIG. 3), and the length of the set screws 50, 52. In one embodiment, cam 54 is adjusted about 15 degrees in each direction for a total adjustment of 30 degrees.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to 'at least one of A, B, and C' is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The invention claimed is:

1. A coupler system comprising:
   a first head component comprising a first drive and a cam comprising a cam engagement surface;
   a second head component comprising a second drive and a wall defining a recess, wherein the second head component is positioned relative to the first head component such that the first drive and second drive are maintained in a substantially coaxial relationship about a rotation axis and the wall and the cam are adjacent to one another, wherein the first head component is rotatable relative to the second head component within the recess about the rotation axis; and
   a first fastener comprising a first end and a second end, wherein the first fastener protrudes through and is held relative to the wall, wherein the second end is adjustable such that adjusting the second end causes a change in a length of the first end protruding from the wall into the recess, wherein the first end contacts and applies a force against the cam engagement surface rotating the cam in the recess such that the angle of the first head component changes relative to the angle of the second head component about the rotation axis based on the change in length of the first end protruding from the wall toward the cam; and
   a first tube coaxial with and non-rotatably engaged with the first drive and a second tube coaxial with and non-rotatably engaged with the second drive, wherein the change in angle of the first head component relative to the angle of the second head component causes the angle of the first tube to change relative to the angle of the second tube about the rotation axis, wherein rotation of the first head component relative to the second head component causes rotation of the first tube relative to the second tube.

2. The coupler system of claim 1, wherein the first drive is recessed a first distance into the first tube and the second drive is recessed into the second tube a second distance less than the first distance.

3. The coupler system of claim 1, wherein the first fastener comprises a set screw.

4. The coupler system of claim 1, further comprising a second fastener held relative to the wall, wherein the first fastener comprises a first set screw which exerts a force on a first side of the cam engagement surface causing a first torque on the cam, and the second fastener comprises a second set screw which exerts a force on a second side of the cam engagement surface causing a second torque on the cam.

5. The coupler system of claim 1, wherein the first fastener is configured to rotate the cam by about 30 degrees about the rotation axis.

6. The coupler system of claim 1, wherein the first fastener rotates the cam which, in turn, rotates the second tube to rotationally align the second tube with the first tube.

7. The coupler system of claim 1, wherein the first tube and the second tube comprise shade tubes in a multi-band arrangement.

8. The coupler system of claim 7, wherein a shade is attached to the shade tubes.

9. The coupler system of claim 1, wherein the first tube and the second tube comprise more than two tubes.

10. The coupler system of claim 1, wherein the first head component includes a male shaft and the second head component includes an inlet configured to rotatably receive the male shaft.

11. The coupler system of claim 1, further comprising a bracket configured to support and act as a bearing surface contacting at least one of the first head component and the second head component.

12. The coupler system of claim 1, wherein the first fastener rotates the cam which, in turn, rotates the first tube relative to the second tube aligning a first hem bar hanging from the second tube with a first hem bar hanging from the first tube.

* * * * *